Sept. 12, 1967 W. I. SOHL 3,341,270
OFFICE EQUIPMENT SYSTEM AND COMPONENTS THEREOF
Filed Oct. 21, 1965 8 Sheets-Sheet 3

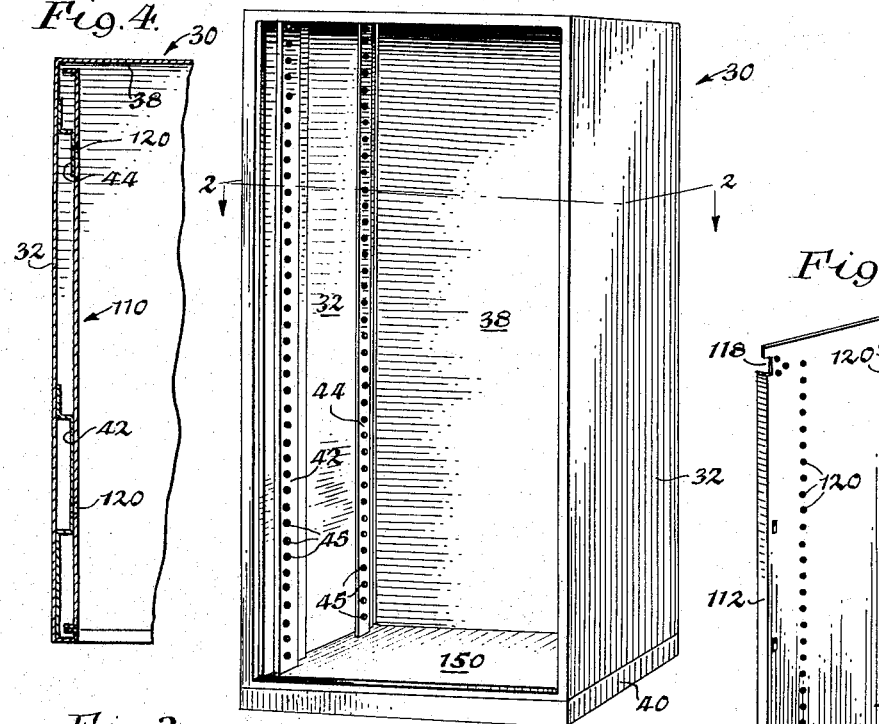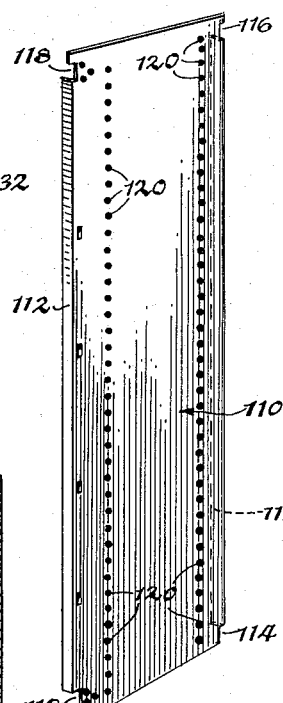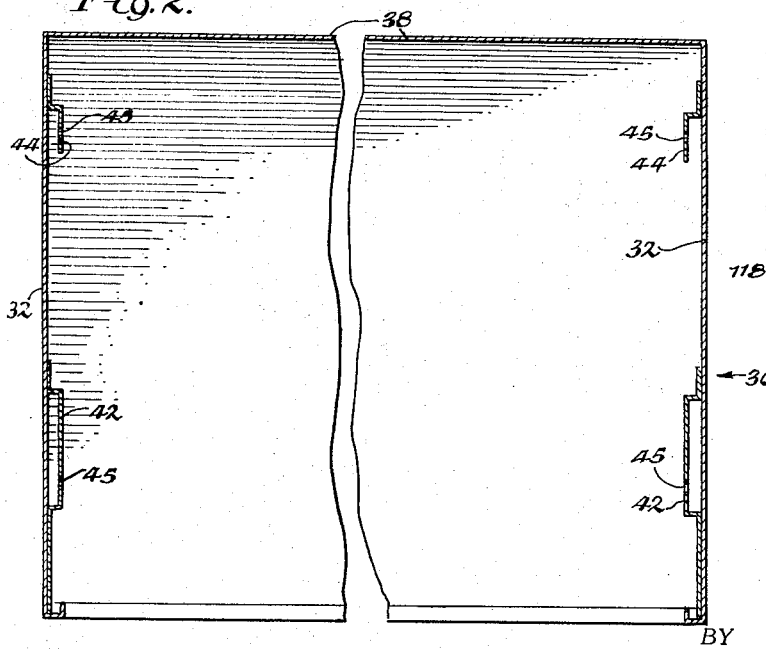

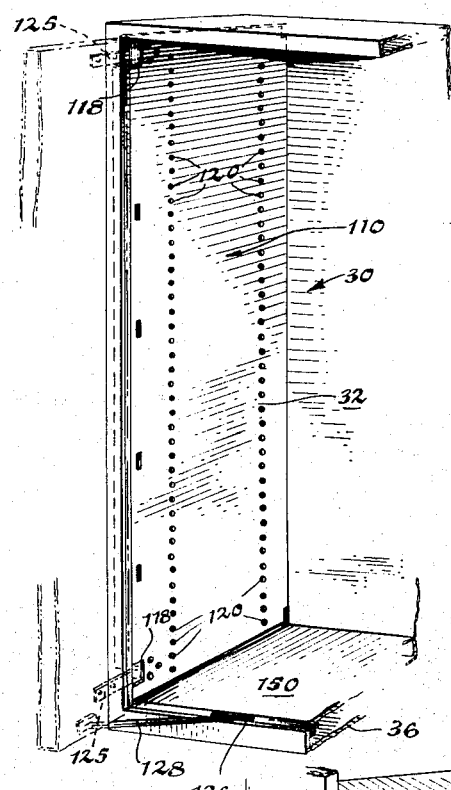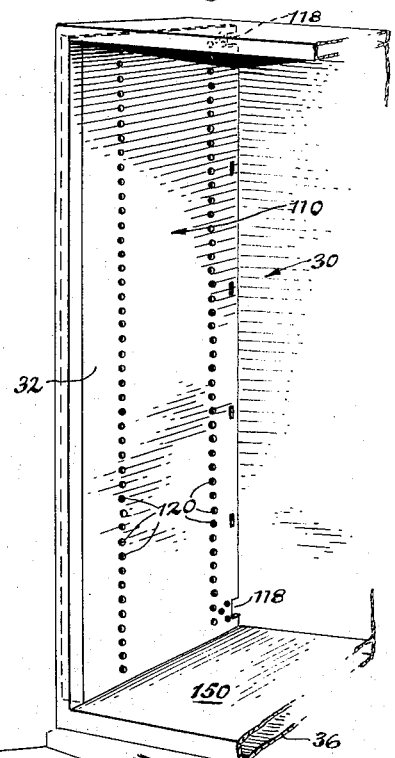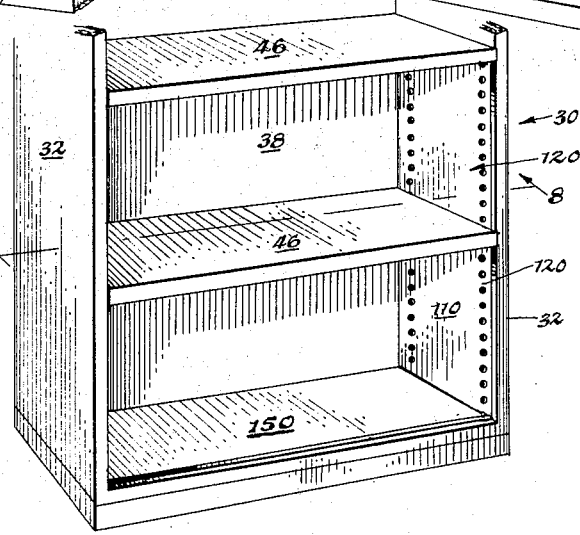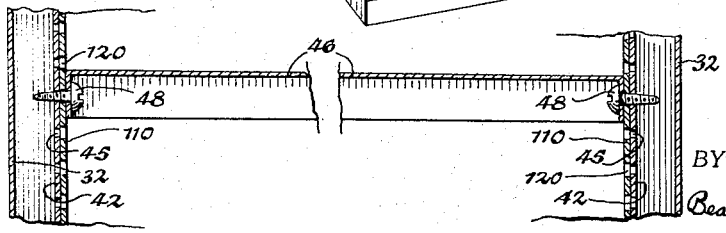

INVENTOR
WILLIAM I. SOHL
BY
Bean Brooks, Buckley + Bean
ATTORNEYS

Sept. 12, 1967 W. I. SOHL 3,341,270
OFFICE EQUIPMENT SYSTEM AND COMPONENTS THEREOF
Filed Oct. 21, 1965 8 Sheets-Sheet 4

INVENTOR.
WILLIAM I. SOHL
BY
Bean, Brooke, Buckley & Bean
ATTORNEYS

Sept. 12, 1967 W. I. SOHL 3,341,270
OFFICE EQUIPMENT SYSTEM AND COMPONENTS THEREOF
Filed Oct. 21, 1965 8 Sheets-Sheet 5
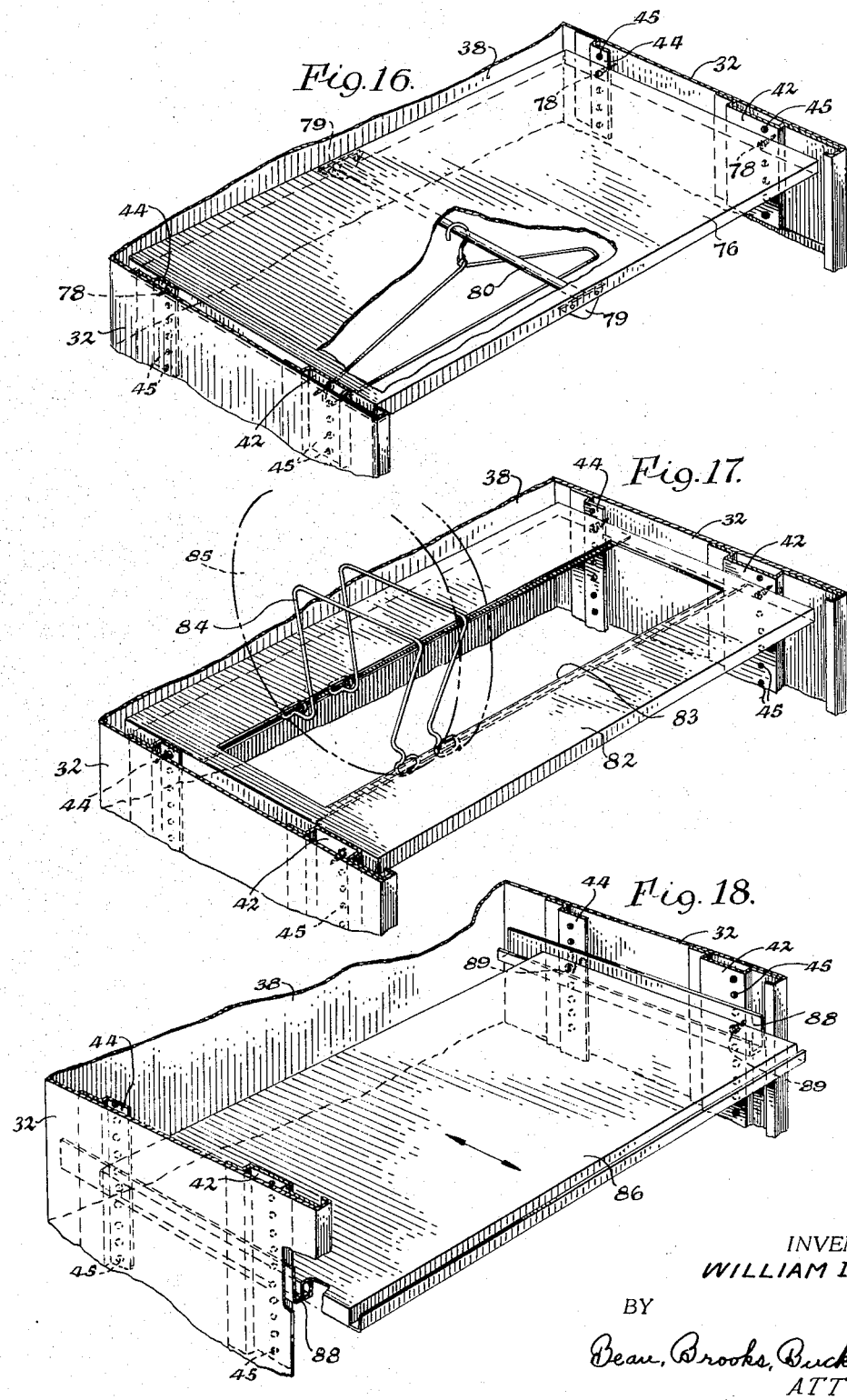
INVENTOR.
WILLIAM I. SOHL
BY
Bean, Brooks, Buckley & Bean
ATTORNEYS

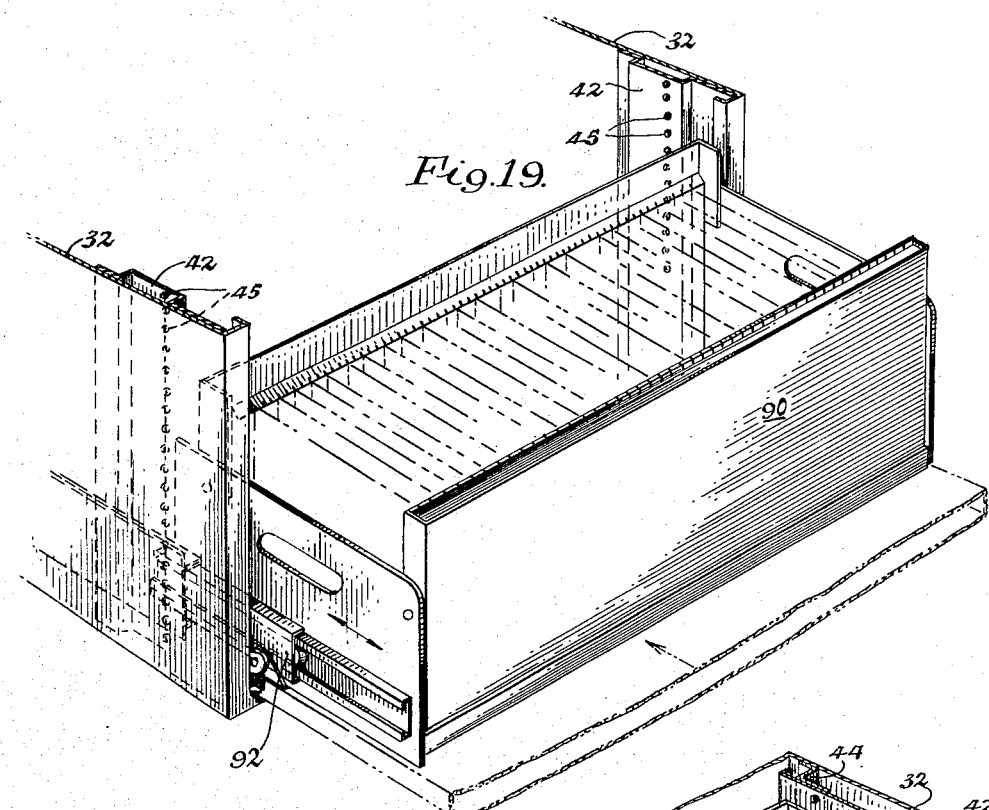
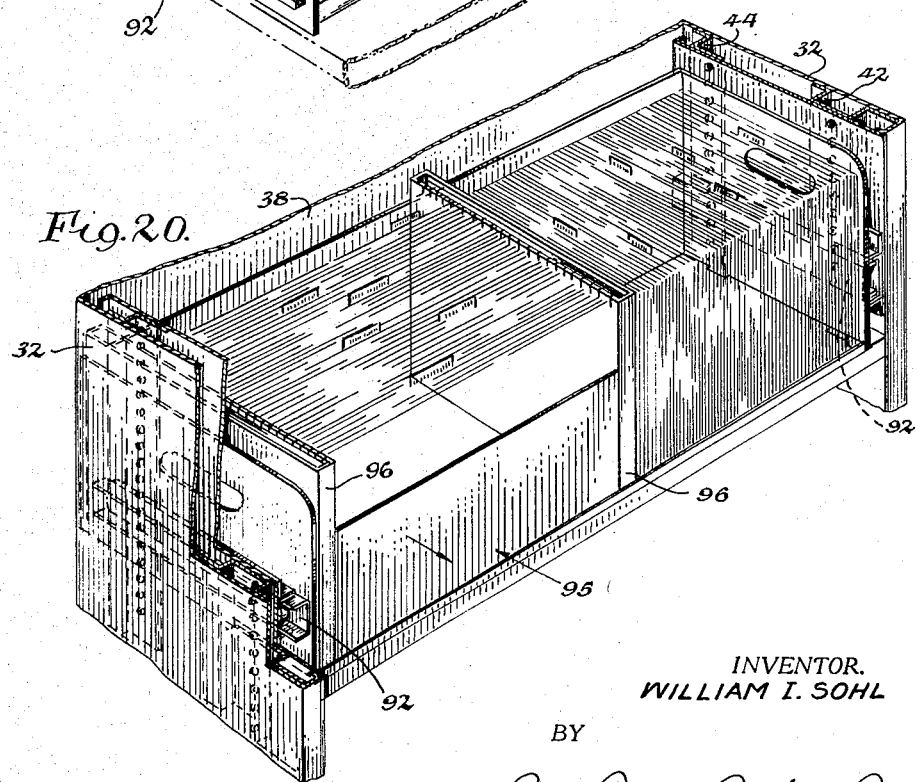

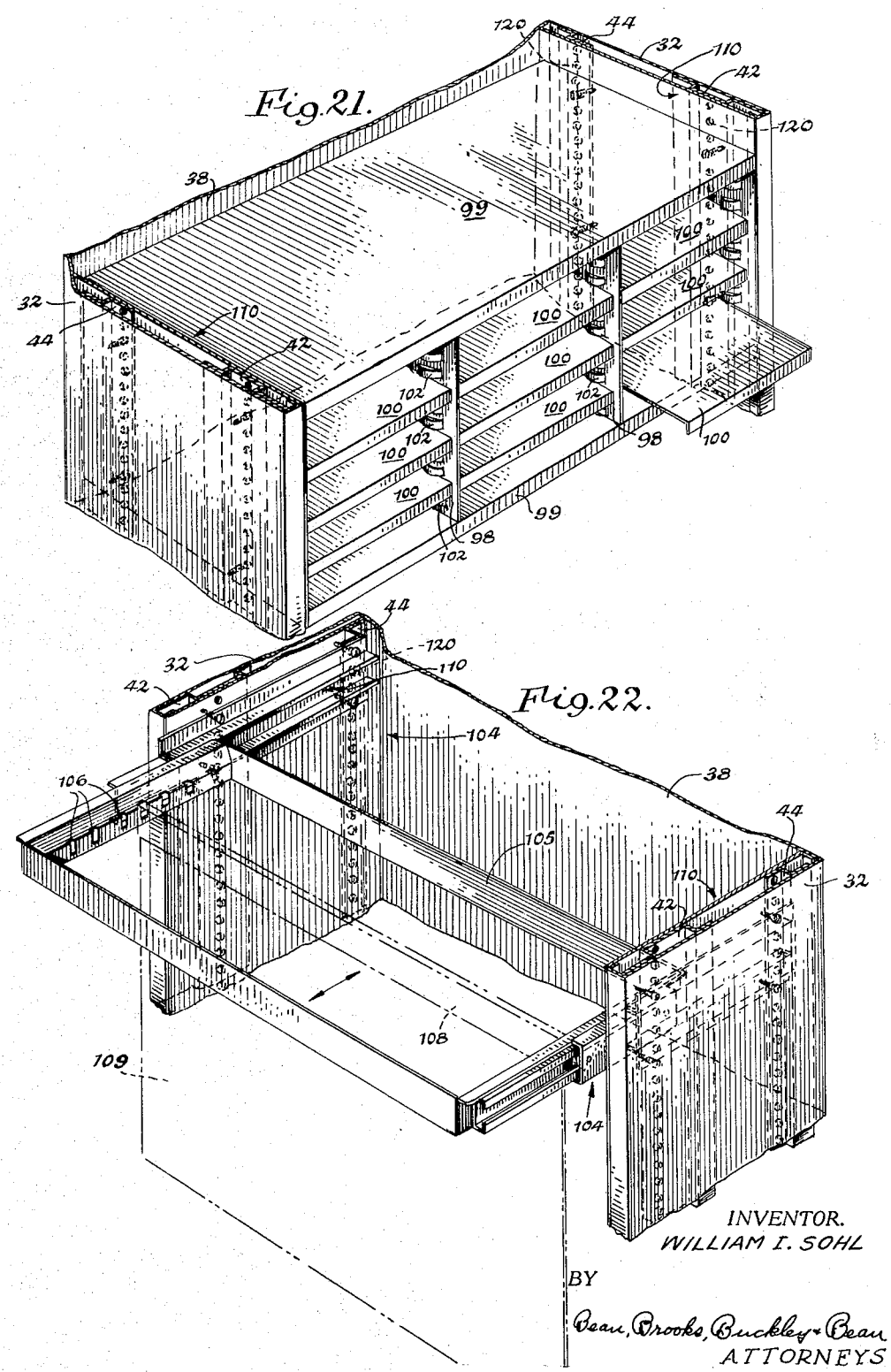

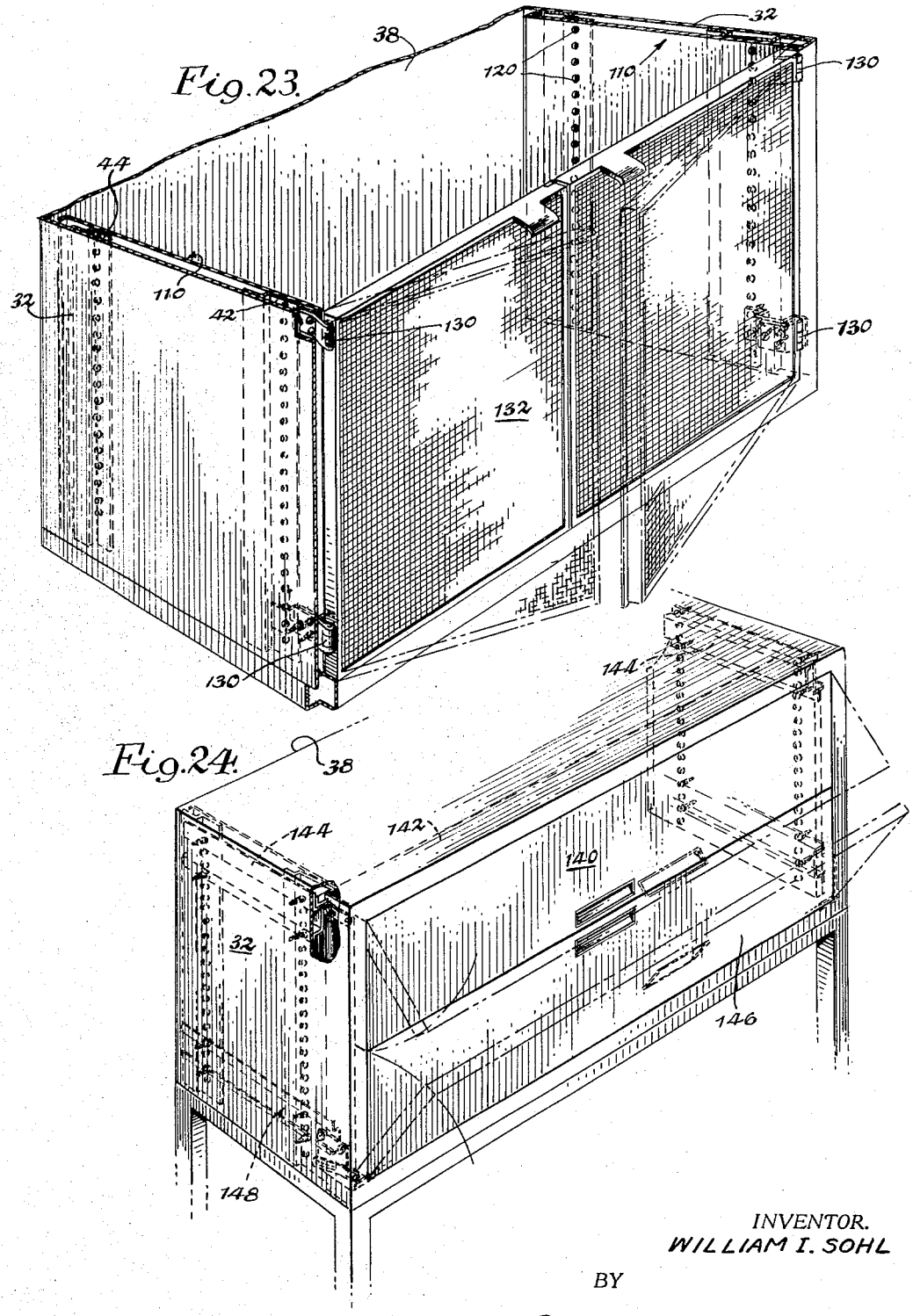

United States Patent Office 3,341,270
Patented Sept. 12, 1967

3,341,270
OFFICE EQUIPMENT SYSTEM AND
COMPONENTS THEREOF
William I. Sohl, Chappaqua, N.Y., assignor to
Art Metal, Inc., Jamestown, N.Y.
Filed Oct. 21, 1965, Ser. No. 499,454
10 Claims. (Cl. 312—214)

This invention relates to so-called office type equipment, such as equipment pieces of furniture and/or cabinet types having movable and fixed shelves and/or drawers, and optional closures, or other such devices to accommodate typical administrative business, or institutional systems and/or supplies, and/or wardrobe storage accessory devices, and the like.

Whereas many varieties of office equipment pieces as aforesaid are currently in use, the manufacture thereof has heretofore involved a complexity of parts, designs and manufacturing procedures, such as to preclude desirable manufacturing economies as are attainable by methods permitting more complete standardization of parts. At the same time the prior equipment designs have provided only minimum versatilities in respect to the available functional rearrangements of the equipment components.

Generally stated, the present invention contemplates provision of only a minimum number of differently dimensioned "shell" components which are basically identical functional capabilities, and which in the majority are assembled of like or "standard" parts. A full line of office equipment of the types illustrated by way of example and described in detail hereinafter, may then be manufactured by fabrication and assembly therewith of "standard" accessory parts, whereby substantial manufacturing economies are available. Furthermore, the equipment so manufactured is subsequently susceptible to conversion from one type of equipment to a large variety of others; whereby the invention provides a convertibility versatility of much higher order than heretofore in the art. Other features and advantages of the invention will appear from the following specification and the accompanying drawing wherein:

FIG. 1 shows by way of example one form of a basic "shell" component of a fabrication of the present invention; the "shell" component being adapted to receive in temporarily assembled relation thereon other component fabrications and/or accessories, thereby providing a variety of office equipment pieces such as are illustrated and described by way of further examples hereinafter;

FIG. 2 is a fragmentary horizontal sectional view on enlarged scale, taken as suggested by line 2—2 of FIG. 1;

FIG. 3 is a perspective view of a shell inside liner panel accessory member, such as may be optionally employed in connection therewith to provide a flush, interiorly "finished" appearance;

FIG. 4 is a view corresponding to a portion of FIG. 3, illustrating one mode of employment of a panel piece as shown in FIG. 3 in conjunction with the shell structure of FIG. 1;

FIG. 5 is a fragmentary perspective of a "shell" as in FIG. 1, but having assembled thereon a panel as shown in FIG. 3 in such mode as to accommodate the mounting on the "shell" of a swing door;

Figure 9:
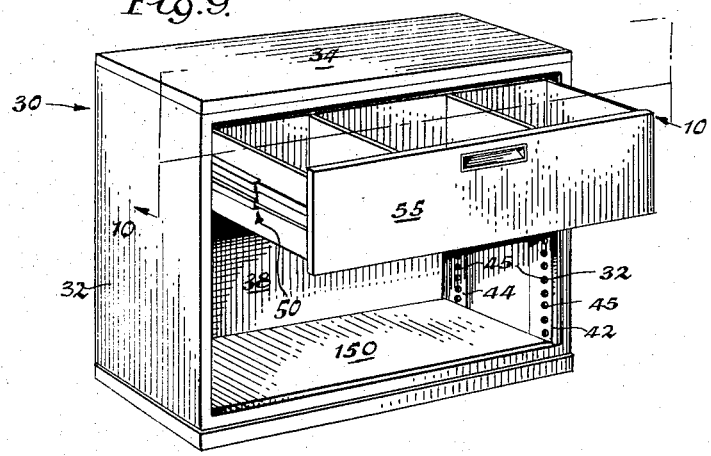
Figure 10:
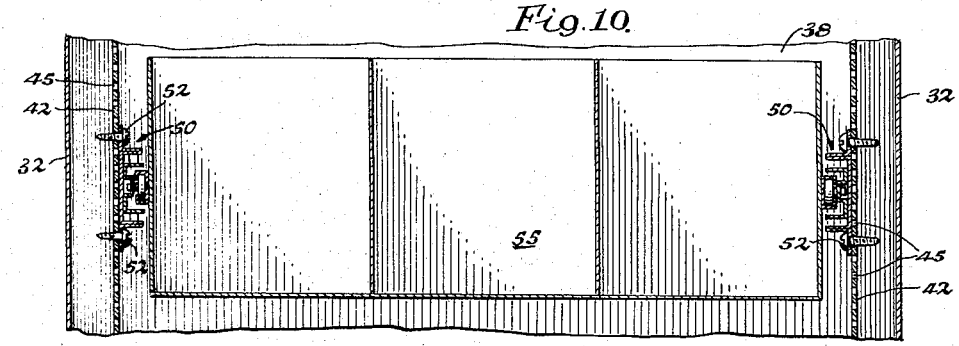
Figure 11:
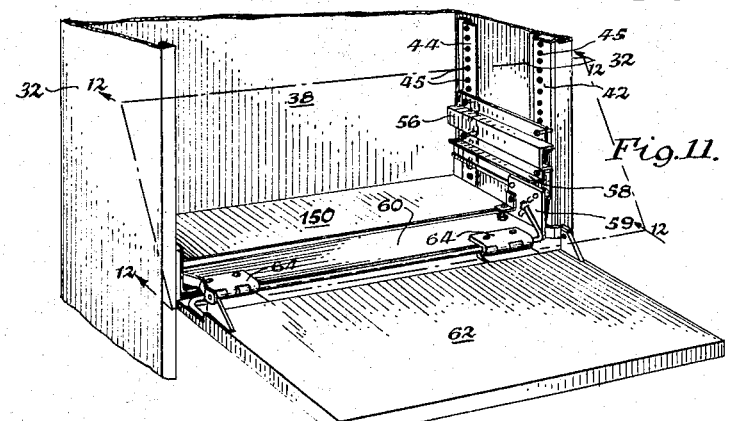
Figure 12:
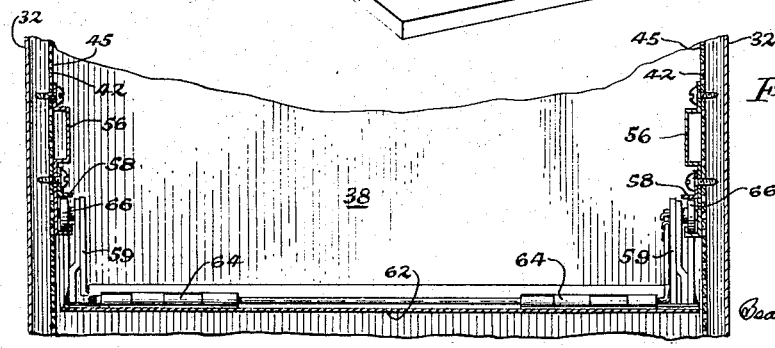
Figure 13:
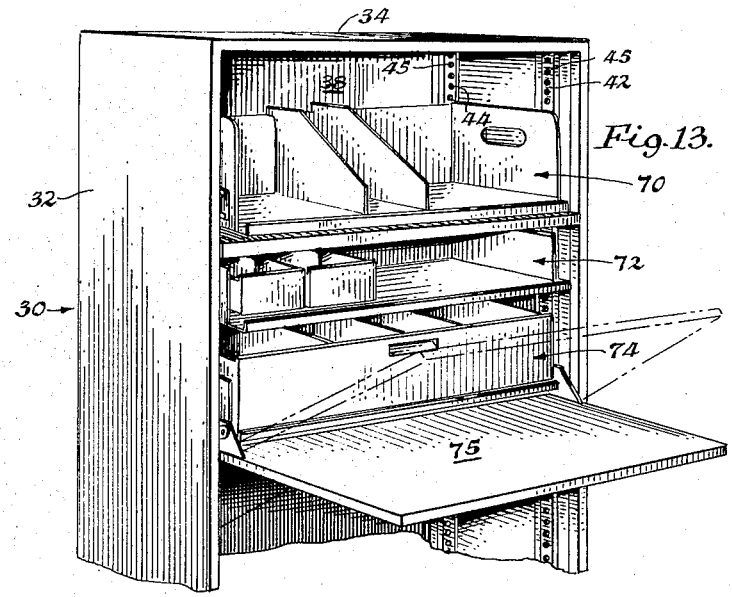
Figure 14:
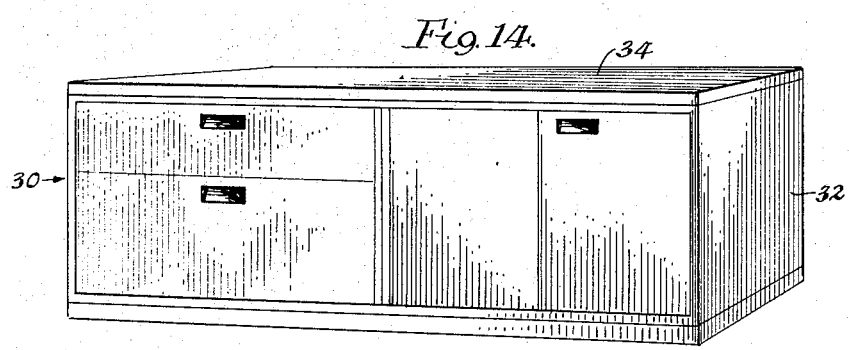
Figure 15:
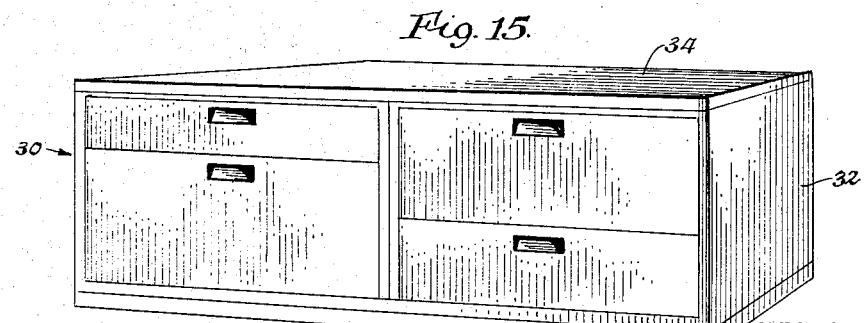

FIG. 6 corresponds to FIG. 5 but illustrates another mode of mounting of the liner panel on the "shell"; as when an "open front" type cabinet is to be furnished;

FIG. 7 illustrates how the "shell" is adapted to provide the basic component of a cabinet containing vertically adjustable shelves;

FIG. 8 is a fragmentary sectional view on enlarged scale, taken as suggested by line 8—8 of FIG. 7, and illustrating the use of "shell" interior cover panels;

FIG. 9 is a view corresponding to FIG. 7 but illustrating accommodation of a movable drawer in the "shell" component;

FIG. 10 is a fragmentary sectional view taken as suggested by line 10—10 of FIG. 9;

FIG. 11 is a fragmentary view corresponding to FIG. 9 but illustrating a typical relative assembly of a standard "shell"; a sliding drawer suspension; and a sliding cradle support for a tilt-down door which may either be used as a reference shelf or pushed inwardly to flush retracted position;

FIG. 12 is a fragmentary sectional view on enlarged scale taken along line 12—12 of FIG. 11;

FIG. 13 is a view corresponding for example to FIGS. 7 and 9 but illustrating the versatility of the system of the invention whereby the "shell" component thereof is adapted to accommodate a variety of fixed and/or movable shelf or drawer units and interior system accessories;

FIG. 14 illustrates provision of a geometrically variant "shell" component of functionally identical characteristics but dimensionally adapted to mount in a side-by-side "module" arrangement, a variety of vertically adjustable, fixed or movable, shelf or drawer units; including optionally available vertically swinging doors and side opening doors;

FIG. 15 corresponds to FIG. 14 but illustrates a "shell" construction as in FIG. 14 accommodating at opposite modules thereof a variety of (up or down) vertically swinging door arrangements;

FIG. 16 is a fragmentary sectional perspective view of a cabinet incorporating the features of the invention and illustrating the "shell" component thereof as accommodating a fixed (but positionally adjustable) shelf device carrying a wardrobe hanger rod;

FIG. 17 corresponds to FIG. 16 but illustrates provision of a reel canister support shelf and bracket system;

FIG. 18 corresponds to FIGS. 16 and 17 but illustrates provision therein of a freely slidable shelf or tray, at any preferred vertical positioning;

FIGS. 19–20 correspond generally to FIGS. 16–18 but illustrate accommodation by the "shell" component of laterally and forwardly faced hanging file systems, respectively;

FIG. 21 corresponds to FIG. 18 but illustrates the use in a standard "shell" of a plurality of vertically standing intermediate partition devices cooperating to slidably support pluralities of movable shelves;

FIG. 22 is a view illustrating provision, in combination with the basic "shell" fabrication, of a suspension system (at any vertically adjustable position) carrying a blueprint or "plan" hanging storage rack device;

FIG. 23 is a view illustrating further versatilities of the system; showing the mounting on a standard "shell" component of perforated front door frame inserts embodying features permitting sound transmission and decor; and FIG. 24 is a view corresponding somewhat to FIG. 11 but illustrating in combination with a "shell" component of the invention, the optional mountings of up or down swinging, receding door panels.

As shown by way of example in the drawing herewith, the invention contemplates provision of a shell component which, although it may be provided in any number of desired geometric proportions and/or dimensions, will in any case be generally in the form of a rectangularly shaped "open-faced" casing. Thus, the shell member will typically comprise opposite side walls; a top wall; a bottom wall; and a back wall member; although it is to be understood that within the concept of the present invention the opposite side walls are the only essential elements of the shell fabrication, and that one or more of the other mentioned elements may be omitted if preferred.

Also, it is to be understood that the "shell" component may be constructed of any preferred material or materials such as sheet metal, sheet plastic, wood panels, combinations thereof, or the like; albeit the accompanying drawing and the corresponding descriptions illustrate the panel fabrications to be constructed of sheet metal.

Referring now more specifically to the drawing herewith, the shell component of the invention is illustrated therein by way of example to comprise a fabrication designated generally by the numeral 30, constructed of sheet metal and comprising opposite, vertically standing side walls 32, 32; top wall 34; bottom wall 36, and rear wall 38. These members may be separately cut from sheet metal stock and then interconnected by any suitable means; or in the alternative they may be integrally formed by appropriately bending sheet metal strip stock into the open-faced rectangular box-like form shown in the drawing herewith, and then mounting a back plate therein by any suitable means. The "shell" is adapted to set directly on a floor surface or up upon a solid flush or recessed base as indicated at 40 (FIG. 1), or upon a legged pedestal or the like as indicated at 42 (FIG. 24); or it may be hung or supported upon a wall or pole system, as may be preferred.

It is a particular feature of the present invention that the "shell" component (when in complete form) is adapted to receive in mounted relation therein a variety of suspension devices at a virtually unlimited selection of vertically adjustable positions. To achieve this result the basic side panels 32, 32 of the "shell" component are fitted with vertically standing stringers at their inside surfaces; each panel 32 being equipped with a front and back stringer as indicated at 42, 44, respectively. As shown in the drawing herewith the members 42 are of "hat-shaped" sectional form, while the members 44 are of the so-called Z sectional form. However, it is to be understood that the members 42–44 may be of any other appropriate sectional form; the requirement being that in any case there be provided flat panel portions extending vertically throughout the vertical extent of the side wall 32 and parallel to but spaced therefrom, and perforated as indicated at 45. Thus, each of the stringers 42, 44 presents a perforated panel portion interiorly of its mounting panel 32, and in parallel spaced relation thereto.

The perforations 45 are preferably closely spaced and are in vertical alignments. Thus, they provide parallel series of apertures adapted to receive machine screws or other connectors whereby suspension devices for cabinet accessories may be readily mounted thereon at any desired elevations. For example, as shown in FIGS. 7, 8, shelves 46 may be mounted interiorly of the "shell" by means of machine screws 48, at any desired elevations in the "shell." Furthermore, as shown in FIGS. 9–13, 16–21, a variety of suspension devices may thus be mounted directly upon the stringers 42, 44. For example, as shown in FIGS. 9, 10, slide suspensions as indicated generally at 50—50 may be fixed to the stringers 42, 44 by means of screws 52 for support of drawers 55 which are thereby supported to be readily slidable in and out of the "shell" for access to the drawer contents. FIGS. 11, 12, illustrate how a combination suspension system may be employed to include "hat-sectioned" rails 56 (for slidably mounting a drawer or tray) and channel-sectioned rails 58 for slidably supporting at opposite sides of the "shell" the upturned end brackets 59—59 of a cradle 60 to the front end of which is hinged an up-swinging door 62 as by means of hinge devices as indicated at 64, 64. Thus, the door 62 is mounted on the "shell" so as to be downwardly swingable upon its hinge devices to its "open" position, and then slidable rearwardly on the cradle rollers 66 running in the tracks 58, 58 into a horizontally retracted position interiorly of the "shell."

FIG. 13 illustrates a further variety of cabinet insert installations such as are readily provided in accordance with the invention; and which as shown in FIG. 13 include a laterally divided "open-front" shelf 70 (mounted on a slide suspension for example such as shown in FIGS. 9, 10); a second (fractional-height) open-front filing shelf 72 on which inserts or trays of various dimensions may be interchangeably accommodated; a sliding drawer type filing shelf 74; and a down-swing door 75 which may be either of the fixed hinged type or receding door type, as explained hereinabove. The trays 70–72 may in fact be loosely mounted accessories, freely removable from their suspensions and thereby used independently of the cabinet and/or interchanged with other accessories inside the cabinet. FIG. 16 illustrates how the "shell" component of the invention is receptive of a shelf device 76 comprising a generally flat panel member having downturned marginal flanges, mounted at the opposite ends thereof to the vertical stringers 42, 44 by means of screws 78 as explained hereinabove, and carrying by means of brackets 79, 79 one or more hanger rods 80 for receiving hanging accessories. FIG. 17 illustrates a generally similar arrangement whereby a shelf member 82 which is centrally apertured as indicated at 83 mounts a plurality of spring wire brackets 84 in parallel mounted relation to be slidable laterally of the shelf device. Thus, the wire brackets 84 are readily positionable, manually, to accommodate in vertically standing positions therebetween a plurality of reels or canisters or the like as indicated at 85, which may be variously sized and/or shaped.

FIG. 18 illustrates how a simple "slide shelf" may be readily fitted into the basic "shell' component. In this case the shelf 86 is simply slide-mounted upon horizontal runners 88, 88 which are carried upon the vertical stringers 42, 44 as by means of screws 89 engaging the apertures 45 of the vertical stringers. FIG. 19 illustrates how a laterally faced "hanging" file system, standard folders, or other systems, may be readily moutned in a drawer or tray designated generally at 90 which is slidably mounted by means of any suitable type suspension devices such as indicated generally at 92, which in turn are mounted by means of machine screws or the like upon the shell stringers 42, 44 as explained hereinabove.

FIG. 20 illustrates how a combination of laterally facing and forwardly-faced "hanging" file, folder, or other systems may be carried in a drawer or tray designated generally at 95 and which comprises end wall portions 96, 96 supported upon the shell stringers 42, 44 by means of suspension devices as shown. FIG. 21 illustrates how an accessory providing a series of slidable trays may be directly mounted (vertically adjustable) upon the stringers 42, 44. In this case the accessory is shown to comprise an outer casing carrying a plurality of intermediate vertical partition members 98 which are fixed in vertically standing positions between horizontally disposed top and bottom walls 99, 99 of the casing. Thus the assembly is adapted to slidably support series of shelves 100, as by means of outwardly punched ledges 102 formed integrally with the vertical partition members 98. FIG. 22 illustrates how a blueprint or "plan" hang file system may be readily mounted in the shell component at any desired height as by means of slide suspension devices 104. In this case a frame 105 is provided to slidably mount upon the suspensions 104, 104, and includes vertical pin devices 106 upon which detachably mount hangers 108 which in turn carry the stored blueprints, plans, or the like, as indicated at 109.

The invention also particularly features the provision of a novel shell-wall liner and unit support panel device as illustrated per se at FIG. 3. FIGS. 4, 5–8 and 21–24 illustrate optionally alternative usages of such panels in conjunction with the basic shell and vertical stringer fabrication, contributing further to the versatilities of the overall system. As shown in FIG. 3 the liner-support panel device comprises a generally flat sheet metal piece designated 110 which is lengthwise dimensioned to conform to the vertical height dimension of the inner face of the "shell" wall portion 32 to which it is to be attached. More specifically, the panel device 110 in any case includes right-angle bent side flange portions 112, 112. As shown best in FIG. 3 in the drawing herewith, one of the side flange portions of the panel is formed with notched-out configurations 114, 116 at opposite ends thereof adapting the panel to interfitting with the "shell" structures at the upper and lower levels thereof. The opposite flange portion 112 is also cut away as indicated at 118 for purposes to be explained hereinafter. Each panel member 110 is also punched to provide a pair of vertically parallel series of closely spaced apertures 120 which are so positioned in the panel 110 that the latter may be disposed as shown for example in FIGS. 4–8, 21–24 in flatwise lapped relation against the perforated panel portions of the "shell" member with the apertures 120 thereby disposed in registry with companion apertures 45 of the stringer members. The apertures 120 are formed of somewhat larger diameters than the apertures 45, and thus it will be appreciated that the liner plates 110 may be readily assembled relative to the "shell" side walls 32, 32 by means of machine screws or the like. Also, it will be appreciated that wherever it is desired to provide the interior of the cabinet "shell" with a flat or "finished" appearance, a panel 110 as aforesaid may be disposed to lie flatwise against each pair of stringers 42, 44 so as to flatwise cover the interiors of the cabinet side walls as shown for example in FIGS. 4–8, 21–24, as distinguished from the arrangements shown in FIGS. 1, 2, 9–13, 16–20. Also as shown in the drawing the registering apertures 45, 120 facilitate assembly of the unit suspension devices previously referred to.

It is a particular feature of the construction of the liner-support panels 110 that because of the different notching configurations at their opposite side flange and edge portions they are adapted to optional installations as shown at FIGS. 5 and 6. Note that in FIG. 5 the panel edge embodying the notched portions 118 is disposed adjacent the front edge of the "shell" component whereby to provide openings accommodating side swinging door hinge devices as indicated at 125. On the other hand whenever the cabinet is to be furnished without such doors the panels 110 are mounted in the "shell" 30 as shown in FIG. 6, whereby the door hinge accommodating notched portions are disposed in the rearmost inner corner portions of the finished cabinet structure, and are thereby concealed from normal view. Hence, whereas the panels 110 (which may be manufactured in large quantities as "standard" parts) may be assembled relative to the basic "shell" and stringer subassembly so as to accommodate hinges mounting side-swinging doors on the cabinet; they may be alternatively disposed as explained hereinabove (whenever side swinging doors are not involved) so as to provide the cabinet interior side walls with a smooth and uninterrupted "finished" appearance flush with the inside vertical frontal configuration of the shell frame. Note that as shown in FIG. 5 for example, a bottom liner member 150 is provided to finish off the shell construction. The plate 150 is formed with down-turned marginal flanges, and one of these flanges is apertured as indicated at 126 to accommodate in sliding relation therethrough a door motion control arm 128. If on the other hand as shown in FIG. 6 no door is to be employed, the bottom liner member 150 will be rotated (before assembly in the shell) to dispose the apertured flange at the rear of the cabinet and therefore out of view.

It will of course be appreciated that by virtue of the present invention only a small number of differently sized and shaped "shell" components are needed, and may be mass-produced to provide the means for fabrication of office equipment pieces of a large variety of types and functional characteristics. Thus only a small line of basic "shell" need be fabricated; preferably so dimensioned and geometrically shaped as to adapt them to efficiently fit (either singly or in combinations of two or more thereof) into architecturally available "modular" spaces. Accordingly the width and depth dimensions of the "shells" will usually be dictated by the architectural plans into which the equipment is to be moved, while the vertical dimensions of the "shells" will of course be primarily dictated by the intended function of the equipment. For example, the "shells" may be of vertically elongate form as shown in FIGS. 1, 7, 13; or of "low-contour" form as illustrated by way of example at FIGS. 9, 14, 15, 23, 24.

In any case the basic "shell" is initially fitted with the desired forms of accessories as illustrated and described herein; it being understood that units such as filing drawers, trays, door support cradles, slide suspension devices, and the like, of mass-produced "standard" dimensions may be interchangeably mounted thereon as preferences dictate without requiring any alterations of parts and/or use of special connection devices. Also, the installed units may with utmost facility be at any time replaced by other "standard" units, as the user's requirements may change.

FIG. 23 further illustrates a versatility of the system of the invention whereby a "shell" component thereof may be readily employed as a simple "interiorly finished" open cabinet with side swinging doors. In this case the panels 110 are mounted against the side walls of the shell so as to dispose their notched portions 118 at the front face of the "shell," thereby accommodating hinges 130 carrying side swinging door panels 132, 134. The door panels may of course be of any preferred material and construction, and as shown in FIG. 23 one or both of the door panels may be of perforated construction such as being made of rigidly framed fabric or the like, whereby to adapt the cabinet to the housing of a sound recording machine or the like. FIG. 24 further illustrates adaptability of the "shell" component of the invention to the mounting thereon of a variety of receding front door arrangements. As shown therein, and as distinguished from other illustrations herein, the "shell" component of FIG. 24 is fitted with a downwardly swinging closure panel 140 which is hingedly supported upon a crossbar 142 which slidably mounts at its opposite ends relative to the side walls 32, 32 of the "shell" component by means of slide suspension devices 144. The lower front portion of the cabinet is closed by means of a door panel 146 which is hingedly connected along its lower edge to another crossbar which is similarly mounted upon slide suspensions 148. Thus it will be appreciated that the upper door 140 may be swung upwardly to "open" position whereupon it may be pushed horizontally rearwardly into retracted position under the top plate portion 38 of the "shell" component; and that the bottom portion of the cabinet may be opened by swinging the door 146 downwardly. The door 146 may be either left to remain in horizontal extended position to function as a working shelf device, or it may be pushed inwardly and retracted within the "shell," as may be preferred.

It is a particular feature of the invention that the liner plates 110 are of generally flat-surfaced form, whereby when they are installed in mounted assembly against the perforated runner portions of the stringers 42, 44, they "finish" off the interior appearance of the cabinet and present to the view a smooth and flat-surfaced effect, flush with the side edges of the cabinet opening. The vertical flange portions 112 complete the smoothly contoured appearance of the assembly when viewed from in front of the cabinet. This is true, whether the liner plates are assembled in the cabinet as shown in FIG. 6, or when assembled as shown in FIG. 5 to accommodate door hinges as explained hereinabove. In addition to this interior "finishing" function of the liner plates 110, it will be apparent that when assembled in the basic shell structure as explained hereinabove they also function to mechanically reinforce and rigidify the overall assembly; providing in combination with the outer shell panels and stringer devices a truss-like construction of minimum thickness but of maximum structural rigidity.

It will of course be appreciated that whereas only a few forms of the invention have been illustrated and described in detail herein, various changes may be made therein without departing from the spirit of the invention or the scope of the following claims.

I claim:

1. An office equipment assembly comprising a shell component including opposite side wall panel portions, a pair of vertical stringer devices rigidly fixed in spaced parallel relation against the inside surfaces of each of said panel portions, each of said stringer devices having a vertically extending runner portion spaced from the adjacent wall panel, said runner portions being perforated at closely spaced intervals in vertical and horizontal alignments, said stringers being thereby adapted to receive insert connection device in detachably engaged relation at vertically adjustable positions thereon for mounting accessory devices in movable relation thereon, and a liner plate member of generally flat-surfaced form disposed in standing relation against each of said stringer runner portions and perforated in congruence therewith, whereby the same insert connection devices may be employed to relatively assemble said liner plates to said stringers and to mount the desired accessory devices upon said assembly.

2. An office equipment assembly comprising a shell component including flat opposite side wall portions, a pair of vertical stringer devices mounted in spaced parallel relation against the inside surfaces of each of said side wall portions, each of said stringer devices being perforated at closely spaced intervals in vertical alignment and being thereby adapted to receive insert connection devices in detachably engaged relation at vertically adjustable positions thereto, and a liner plate member of generally flat-surfaced form disposed in standing relation against each of said stringer runner portions and perforated in congruence therewith, whereby the same insert connection devices may be employed to relatively assemble said liner plates to said stringers and to mount the desired accessory devices upon said assembly.

3. An office equipment assembly comprising a shell component including flat opposite side wall portions, a pair of vertical stringer devices mounted in spaced parallel relation against the inside surfaces of each of said side wall portions, each of said stringer devices being perforated at closely spaced intervals in vertical alignment and being thereby adapted to receive insert connection devices in detachably engaged relation at vertically adjustable positions thereon, and a liner plate member of generally flat-surfaced form disposed in standing relation against each of said stringer perforated portions and perforated in congruence therewith, whereby the same insert connection devices may be employed to relatively assemble said liner plates and said stringers to said shell and to mount the desired accessory devices upon said assembly, said liner plate members being each notched along only one vertical edge thereof to accommodate door hinges when mounted in complementary relation thereto.

4. An office equipment assembly comprising a shell component including opposite side wall portions, vertical stringer means mounted upon the inside surfaces of each of said side wall portions, each of said stringer means having runner portions perforated at closely spaced intervals in horizontal and vertical alignments and being thereby adapted to receive insert connection devices in slide-fitted detachably engaged relation at vertically adjustable positions thereon for mounting accessory devices in movable relation thereon, and a liner plate member of generally flat-surfaced form disposed in standing relation against each of said stringer runner portions and perforated in congruence therewith, whereby the same insert connection devices may be employed to relatively assemble said liner plates to said stringers and to mount the desired accessory devices upon said assembly.

5. An office equipment assembly comprising a shell component including opposite side wall portions, vertical stringer means mounted upon the inside surfaces of each of said side wall portions, each of said stringer means having runner portions perforated at closely spaced intervals in horizontal and vertical alignments and being thereby adapted to receive insert connection devices in slide-fitted detachably engaged relation at vertically adjustable positions thereon for mounting accessory devices in movable relation thereon, and a liner plate member of generally flat-surfaced form disposed in standing relation against each of said stringer runner portions and perforated in congruence therewith, whereby the same insert connection devices may be employed to relatively assemble said liner plates and said stringers to said shell and to mount the desired accessory devices upon said assembly, said liner plate members being each notched along only one vertical edge thereof to accommodate door hinges when mounted in complementary relation thereto.

6. An office equipment assembly comprising a shell component including opposite side wall panel portions, a pair of vertical stringer devices rigidly fixed in spaced parallel relation against the inside surfaces of each of said panel portions, each of said stringer devices having a vertically extending runner portion spaced from the adjacent wall panel, said runner portions being perforated at closely spaced intervals in vertical and horizontal alignments, said stringers being thereby adapted to receive insert connection devices in detachably engaged relation at vertically adjustable positions thereon for mounting accessory devices in movable relation thereon, a liner plate member of generally flat-surfaced form disposed in standing relation against each of said stringer runner portions and perforated in congruence therewith, whereby the same insert connection devices may be employed to relatively assembly said liner plates to said stringers and to mount the desired accessory devices upon said assembly, and a bottom liner plate member comprising a flat floor portion having downturned edge flange portions perimetrically thereof closing the bottom portion of said shell by means of a smooth-surfaced flooring disposed substantially flush with the bottom profile of the shell front opening.

7. An office equipment assembly comprising a shell component including opposite side wall panel portions, a pair of vertical stringer devices rigidly fixed in spaced parallel relation against the inside surfaces of each of said panel portions, each of said stringer devices having a vertically extending runner portion spaced from the adjacent wall panel, said runner portions being perforated at closely spaced intervals in vertical and horizontal alignments, said stringers being thereby adapted to receive insert connection devices in detachably engaged relation at vertically adjustable positions thereon for mounting accessory devices in movable relation thereon, a liner plate member of generally flat-surfaced form disposed in standing relation against each of said stringer runner portions and perforated in congruence therewith, whereby the same insert connection devices may be employed to relatively assemble said liner plates and said stringers to said shell and to mount the desired accessory devices upon said assembly, and a bottom liner plate member comprising a flat floor portion having downturned edge flange portions perimetrically thereof closing the bottom portion of said shell by means of a smooth-surfaced flooring disposed substantially flush with the bottom profile of the shell front opening, one of the edge flange portions of said bottom liner plate being notched to accommodate therethrough a door-stopping link member, said bottom liner plate being positionally shiftable in said shell whereby said notched flange may be disposed alternatively to the front of said shell or in another direction relative thereto.

8. An office equipment assembly comprising a shell component including opposite side wall panel portions, a pair of vertical stringer devices rigidly fixed in spaced parallel relation against the inside surfaces of each of said panel portions, each of said stringer devices having a vertically extending runner portion spaced from the adjacent wall panel, said runner portions being perforated at closely spaced intervals in vertical and horizontal alignments, said stringers being thereby adapted to receive insert connection devices in detachably engaged relation at vertically adjustable positions thereon for mounting accessory devices in movable relation thereon, and a liner plate member of generally flat-surfaced form disposed in standing relation against each of said stringer runner portions and perforated in congruence therewith, whereby the same insert connection devices may be employed to relatively assemble said liner plates to said stringers and to mount the desired accessory devices upon said assembly, and whereby said shell side wall panels and said stringers and said liner plate members cooperate when fixed together by said connection devices to provide shell wall constructions of truss-like sectional form.

9. An office equipment assembly comprising a shell component including flat opposed outside and intermediate partition wall portions, a pair of vertical stringer devices mounted against the inside surfaces of each of said wall portions, each of said stringer devices having portions disposed in spaced relation to said wall portions and perforated at closely spaced intervals in horizontal and vertical alignments and being thereby adapted to receive insert connection devices in detachably engaged relation at vertically adjustable positions thereon, and a liner plate member of generally flat-surfaced form disposed in standing relation against each of said stringer perforated portions and perforated in congruence therewith, whereby the same insert connection devices may be employed to relatively assemble said liner plates and said stringers to said shell and to mount the desired accessory devices upon said assembly, said liner plate members being each notched along only one vertical edge thereof to accommodate door hinges when mounted in complementary relation thereto.

10. An office equipment assembly comprising a shell component including flat opposite side wall portions, a top wall portion and a bottom wall portion, said side and bottom wall portions being provided with flanges therealong to define an opening into the shell component, a pair of vertical stringer devices mounted in spaced parallel relation against the inside surfaces of each of said side wall portions, each of said stringer devices having a vertically extending runner portion spaced from the adjacent wall panel and each such runner portion being perforated at vertical intervals therealong, a liner plate member of generally flat-surfaced form disposed in standing relation against each of said stringer runner portions and perforated in congruence therewith, said liner plate members being disposed substantially flush with the aforesaid opening in the shell component defined by the flanges on the side wall portions thereof, a bottom liner plate member comprising a flat floor portion having downturned edge flange portions perimetrically thereof secured to said shell with said flat floor portion substantially flush with the aforesaid opening in the shell component as defined by the flange on said bottom wall of the shell, and accessory devices extending between said liner plate members associated with said side walls and including means cooperating with said perforations to hold both said components and said liner plates in fixed relation to said stringer devices.

References Cited
UNITED STATES PATENTS

| | | | |
|---|---|---|---|
| 1,504,523 | 8/1924 | Sherer | 108—107 X |
| 1,729,475 | 9/1929 | Brainard | 312—257 |
| 1,735,375 | 11/1929 | Card | 312—257 |
| 1,930,547 | 10/1933 | Bales | 312—323 X |
| 2,333,511 | 11/1943 | Bates | 109—53 |
| 2,853,355 | 9/1958 | Paca | 312—311 |

FOREIGN PATENTS

| | | |
|---|---|---|
| 820,150 | 9/1957 | Great Britain. |

CHANCELLOR E. HARRIS, *Primary Examiner.*